United States Patent [19]
Green

[11] 3,961,305
[45] June 1, 1976

[54] FLUID FOR FILLING SONAR TRANSDUCERS

[75] Inventor: Charles E. Green, San Diego, Calif.

[73] Assignee: The United States of America as represented by the Secretary of the Navy, Washington, D.C.

[22] Filed: Feb. 14, 1975

[21] Appl. No.: 550,067

[52] U.S. Cl. .............................. 340/8 LF; 340/8 R; 340/10

[51] Int. Cl.² .............................. H04B 13/00

[58] Field of Search .............. 340/8 R, 8 MM, 8 LF, 340/9, 10, 11, 12 R, 13 R, 14; 310/8.2

[56] References Cited

UNITED STATES PATENTS

| | | | |
|---|---|---|---|
| 2,404,391 | 7/1946 | Mason | 340/8 MM |
| 2,405,210 | 8/1946 | Inglis | 340/13 R |
| 2,427,348 | 9/1947 | Bond et al. | 340/8 LF |
| 2,434,666 | 1/1948 | Mason | 340/8 R |
| 2,438,936 | 4/1948 | Mason | 340/8 LF |

*Primary Examiner*—Harold Tudor
*Attorney, Agent, or Firm*—Richard S. Sciascia; Ervin F. Johnston; Thomas Glenn Keough

[57] ABSTRACT

A transducer of acoustic energy through seawater couples its active element to an acoustic window using polyalkylene glycol. The particular polyalkylene glycol selected exhibits improved acoustic, chemical, physical, and environmental properties. Two satisfactory liquids marketed under the trade designation's "UCON Transducer Fluid 28" and "UCON Lubricant LB-135" have satisfactory properties for being the coupling medium.

2 Claims, 5 Drawing Figures

| | PROPERTIES | POLYALKYLENE GLYCOL FLUID 28 | ESTER OF TRIGLYCERIDE (CASTOR OIL) | PHENOL POLYSILOXANE |
|---|---|---|---|---|
| | **ACOUSTIC** | | | |
| 1. | VELOCITY OF SOUND | (SEE FIGURE 3) | (SEE FIGURE 3) | (SEE FIGURE 3) |
| 2. | DENSITY (g/cc) | 1.000 | 0.959 | 0.992 |
| 3. | ACOUSTIC IMPEDANCE AT 5°C | 1392 (SEE FIGURE 4) | 1502 | 1131 |
| 4. | SIGNAL ATTENUATION | NO MEASURABLE LOSS | MEASURABLE LOSS ABOVE 1 MHz | MEASURABLE LOSS ABOVE 50 kHz |
| 5. | DISSIPATION FACTOR | 0.0003 | 0.0003 | 0.0004 |
| | **CHEMICAL** | | | |
| 6. | STABILITY WITH TIME | NO CHANGE | NO CHANGE | NO CHANGE |
| 7. | STABILITY WITH TEMPERATURE | NO CHANGE | VISCOUS AT 0°C | NO CHANGE |
| 8. | STABILITY WITH VACUUM | NO CHANGE | POLYMERIZES IF STORED AT $<1000\mu$ | NO CHANGE |
| 9. | CHEMICAL COMPATIBILITY | NO EFFECT ON MATERIALS | NO EFFECT ON MATERIALS | ATTACKS BUTYL AND BUNA RUBBER |
| 10. | EQUILIBRIUM WATER CONTENT | 0.5 % | 0.25 % | 0.03 % |
| | **PHYSICAL** | | | |
| 11. | VISCOSITY | (SEE FIGURE 5) | (SEE FIGURE 5) | (SEE FIGURE 5) |
| 12. | CHANGE (VOLUME/TEMPERATURE) | 0.00043 | 0.00066 | 0.00096 |
| 13. | CHANGE (VOLUME/PRESSURE) | 0.0025 | 0.0053 | 0.0096 |
| 14. | DIELECTRIC CONSTANT | 5.0 | 4.5 | 2.78 |
| 15. | VOLUME RESISTIVITY | $8.5 \times 10^{12}$ | $20 \times 10^{10}$ | $20 \times 10^{12}$ |
| 16. | ADHESIVENESS | GOOD | GOOD | GOOD |
| 17. | COHESIVENESS | DOES NOT CAVITATE | CAVITATES AT SAME INTENSITY AS WATER | CAVITATES AT 1/3 INTENSITY OF WATER |
| 18. | ARC-OVER | NO EFFECT | FORMS CARBON PATH | FORMS AIR PATH |
| | **ENVIRONMENTAL** | | | |
| 19. | EFFECT ON PERSONNEL | NO EFFECT | NO EFFECT | SKIN AND EYE IRRITATION |
| 20. | EFFECT ON ENVIRONMENT | NO EFFECT | NO EFFECT | ABRASIVE, DIFFICULT TO CLEAN PARTS |
| 21. | DISPOSAL | INCINERATE | RETURN TO COMPANY | COMBUSTION |
| 22. | COST (\$/lB) | 0.31 | 0.44 | 4.50 |

FIG. 2

FLUID FOR FILLING SONAR TRANSDUCERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Transducers of acoustic energy to and from a water medium are many and varied in design. Operational considerations such as a desired frequency response or pressure insensitivity, for example, have led to filling a transducer's housing with a liquid.

Obviously, not all liquids are satisfactory, particularly when they must couple the transducer's active element to its acoustic window. The liquid should have the right acoustic properties so that there is no convergence or divergence of the acoustic signal. The chemical composition of the fluid should have certain stabilities and compatibilities with other parts of the transducer. Handling the liquid should pose no hazards when the transducer is periodically repaired or serviced. For these and several other reasons, castor oil has been used for a number of years as the acoustic link in one type of transducers. However, castor oil tends to be too viscous at low temperatures. Even at room temperature castor oil is too viscous to fill all the voids and small cavities in a transducer. Another type transducer has an orifice between the driving element and the acoustic window and cannot use castor oil at all when it is operated in cold water. Another somewhat acceptable liquid that has been used in acoustic transducers is phenol polysiloxane. The acoustic and physical properties of this liquid are consistent with sound transducer design. However, it reacts with the butyl and buna rubber which is usually used as transducer sealing elements and, in addition, it causes skin and eye irritations. These two liquids are discussed only for comparison purposes to demonstrate that, while they come to standards in some aspects, they are deficient in other respects. For these reasons and several others not elaborated on they are not generally regarded as the best available. A variety of other liquids have been used in other liquid filled transducers, yet all have some shortcomings in the trade-off of balancing the required acoustic, chemical, physical, and environmental properties. A continuing need exists in the state of the art for a liquid which satisfactorily couples a transducer's driving element to its acoustic window.

SUMMARY OF THE INVENTION

This invention is directed to providing an improvement for a transducer of acoustic energy which has its active element fluidly coupled to an acoustic window. Polyalkylene glycol fills the transducer housing and all the voids therein to acoustically interconnect the active element and the acoustic window. The invention is also directed to providing a method of filling a transducer housing with polyalkylene glycol to ensure improved performance.

It is a prime object of the invention to provide an improved transducer of acoustic energy.

Yet another object of the invention is to provide a transducer of acoustic energy filled with polyalkylene glycol.

Yet another object of the invention is to provide an improved transducer filled with a liquid marketed under the trade designation "UCON Transducer Fluid 28".

Yet another object of the invention is to provide an improved transducer filled with a liquid marketed under the trade designation "UCON Lubricant LB-135".

Another object of the invention is to provide a method of improving a transducer's operational characteristics.

Still another object is to provide a method of filling a transducer with polyalkylene glycol for improved performance.

Yet another object of the invention is to provide a method for filling a transducer with a liquid commercially marketed under the trade designation "UCON Transducer Fluid 28".

Yet another object of the invention is to provide a method of filling a transducer with a commercially available liquid marketed under the trade designation of "UCON Lubricant LB-135".

These and other objects of the invention will become more readily apparent from the ensuing description when taken together with the drawings.

BRIEF DESCRIPTION OF THE DRAWINGS

FIG. 2 is a table of properties of three transducer liquids.

DESCRIPTION OF THE PREFERRED EMBODIMENT

Figure 1:
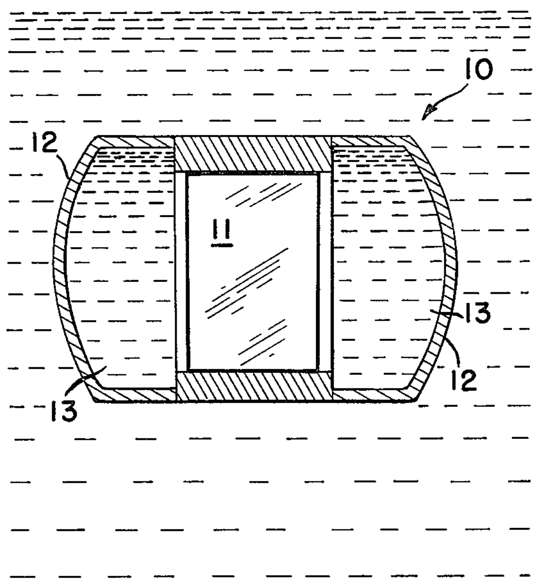
FIG. 1 is an isometric depiction of a typical transducer as modified by the present improvement.

Referring now to the drawings, FIG. 1 shows a representative transducer 10 in which its active element 11 is acoustically coupled to its acoustic window 12, otherwise known as a projection or receiving surface. The active element is any one of a number of magnetostrictive or ferroelectric arrangements that either are responsively displaceable by driving potentials to project acoustic energy, or generate electromagnetic signals in response to impinging acoustic energy.

Irrespective which mode of operation is called for, the coupling medium in this transducer is a liquid 13. This liquid serves to effect an acoustic energy transfer between the active element and the acoustic window.

Liquid filled transducers are designed and used for a variety of reasons. One reason might be that although there is a sacrifice of sensitivity, a liquid filled transducer can be made nonresponsive to ambient pressure variations. Such a transducer is capable of being operated at extreme depths. Or, a frequency range of interest is influenced by liquid filling a transducer.

The suitability of a liquid filled transducer depends on a number of operating characteristics. Often, these characteristics are governed by the choice of the liquid.

A liquid is acceptable as a sound energy transfer medium if it meets certain criteria. The decision to accept one liquid over another usually is based upon a comparison of the properties of the liquids in the acoustical, mechanical, physical, and environmental categories.

One of the most important acoustical properties gains eminence when the acoustic window of the transducer is not flat. This configuration requires that the velocity of the sound in the liquid should be a close match to that of water to prevent convergence or divergence of the acoustic signal. In addition, the acoustical impedance should match that of water to prevent reflections at the window-water interface. Another consideration is the loss in signal level at higher frequencies as well as the dissipation factor of the liquid. Although the signal loss and dissipation factor are actually related, they are treated individually to shed light on the effects where the path length and frequency could be of concern.

The chemical properties of the liquid are high on the relative criteria for determining the most acceptable liquid. The most important of which is that the liquid not be a safety hazard, nor can it adversely react with elements of the transducer. Since most transducers are evacuated with a high-vacuum pump to remove all air and moisture prior to being liquid filled, the liquid must remain stable under vacuum as it is transferred into the transducer. Generally, because years pass between servicing, the liquid must possess a stability for an extended period of time under various temperatures and pressures while in the vacuum. In addition, the liquid must exhibit a capability for absorbing water that might slowly permeate the transducer acoustic window without a deterioration of the liquid's behavior.

With respect to the liquid's physical properties, it should be viscous enough to lend itself to filling all the voids and cavities in the transducer. The viscosity should not change appreciably over the temperature range to which it is exposed. The amount of change in volume with temperature and pressure must be known and since the liquid operates in an electric field, its dielectric and volume resistivity properties must be known. Because the liquid occupies a high intensity acoustic field, its adhesive and cohesive properties play an important part. Electrical arc-over also must be considered when operating at high driving potentials.

The key environmental properties facing a designer are, first, that the liquid must be inert to the extent that it will have no short or long term injurious effects. Secondly, the vapors of the liquid must not affect nor be difficult to remove from other transducer components. Lastly, the liquid, when discarded, must be compatible with disposable techniques and environmental requirements.

With the foregoing properties in mind, an objective evaluation of a variety of liquids has led to the identification of and selection of a superior liquid for use as the coupling medium. This liquid is a polyalkylene glycol commercially marketed by the Union Carbide Company under the trade designation "UCON Lubricant Transducer Fluid 28". The Fluid 28 is the lubricant marketed by Union Carbide Company under the trade designation "UCON Lubricant LB 135" to which a small amount of antioxidant has been added.

Use of these two liquids as lubricants has been known throughout industry for some time. However, the selection of the Fluid 28 as the coupling medium in an acoustic transducer has produced highly satisfactory improvements in transducer design and operation.

Just what these improvements are can be best gleaned from a comparison with two other fluids commonly used in contemporary transducers. The first fluid used for comparison is an ester of triglyceride, a castor oil, marketed by Baker Castor Oil under the trade designation "DB". The second is a phenol polysiloxane of the type marketed by the Dow Corning Company under the trade designation "DC 510". By this comparison the advantages of using Fluid 28 are evident.

Figure 3:
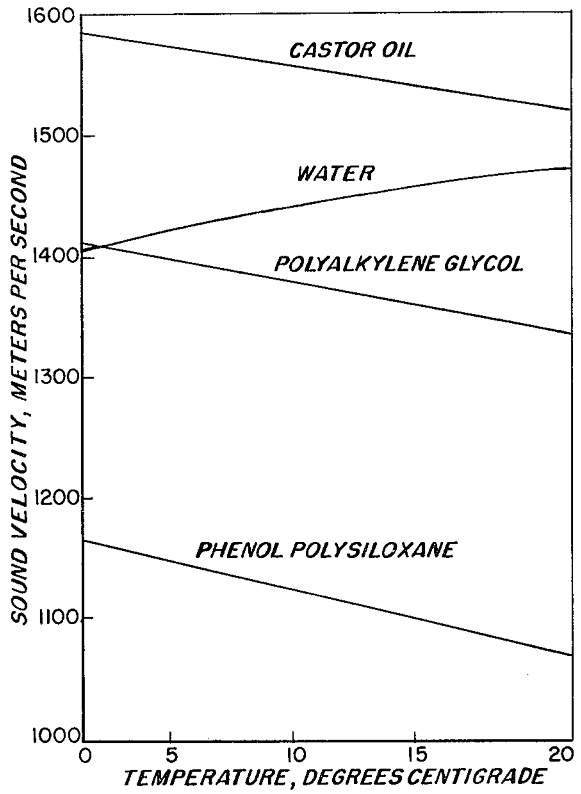
FIGS. 3 through 5 depict certain properties of transducer liquids.
Figure 4:
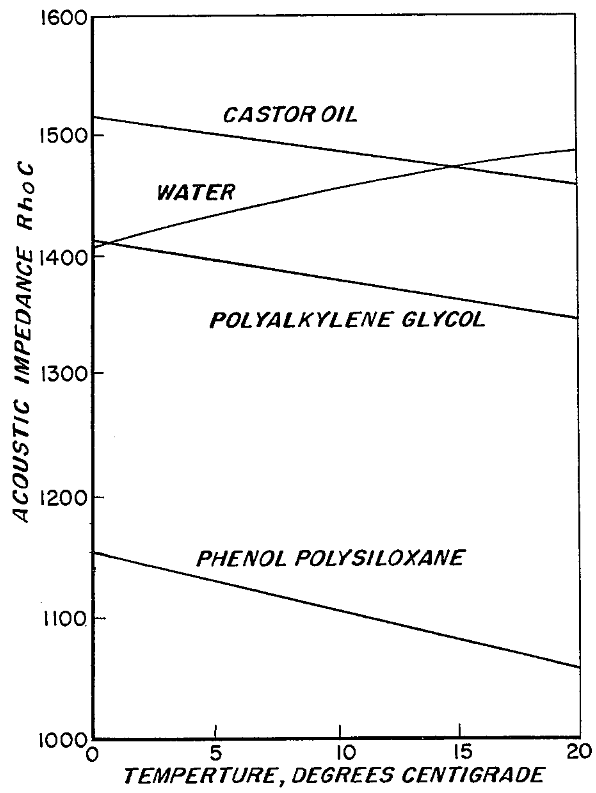
Figure 5:
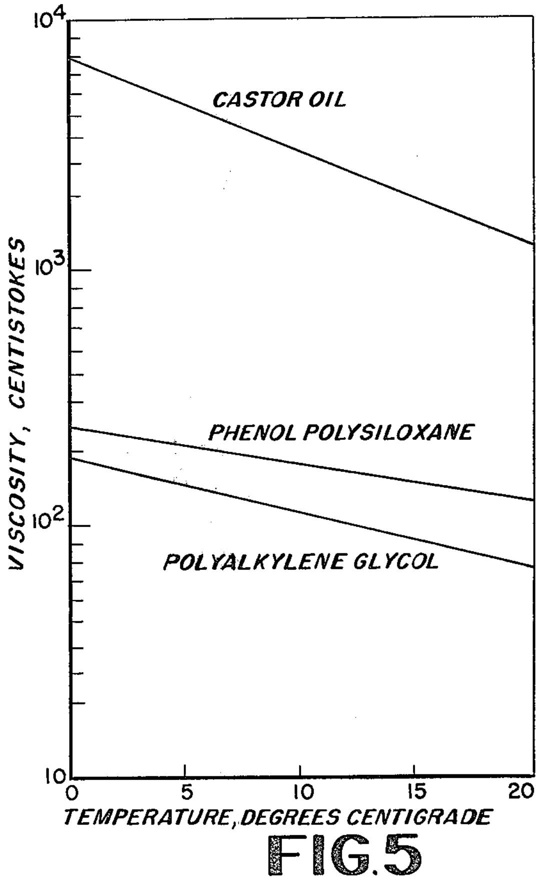

From laboratory tests the results are set forth in the table of FIG. 2 and the graphs of properties of FIGS. 3, 4, and 5.

As mentioned before, there are many criteria to be considered in the choice of the most suitable liquid. Perhaps no one liquid can best meet all the desired properties, so it is essential to use that liquid which most nearly meets all criteria especially in those areas of highest importance. Consequently, a good many liquids that might be considered as potential candidates are eliminated by cursory examination, by reason of being inadequate in one or more of the critical properties.

Such properties are set forth in the table of FIG. 2 in the drawings. The three closest candidates possessing the desired properties are registered on the table and their properties were derived from laboratory tests.

The first property, the velocity of sound through the liquid, is particularly important in transducers that do not have flat acoustic windows. If the velocity of sound in the liquid varies appreciably from the velocity of sound in water, the incident or projected sound wave will converge or diverge. Noting FIG. 3, at zero degrees centigrade the velocity of propagation of castor oil is well above the velocity of sound in water and the velocity of phenol polysiloxane is considerably lower. The velocity of the polyalkylene glycol is the same as water and at twenty degrees centigrade the sound velocities of these two liquids do not appreciably differ. In this property polyalkylene glycol excels.

The density of the polyalkylene glycol is shown to be one gram per cubic centimeter whereas the other two liquids are slightly less. This directly affects the density velocity product "RhoC" (which is equal to a value of density times the velocity of sound in the medium). Because the density of polyalkylene glycol and water are nearly the same and the velocity of sound through both mediums is nearly the same, a good acoustic impedance match is created between the polyalkylene glycol and water. A mismatch of these impedances causes internal reflections and signal degradation.

Dissipation is the signal loss within the liquid and should be as low as possible. All three liquids show a good dissipation factor.

A transducer liquid should not change in any characteristics from its original state when stored as received from the manufacturer, when stored under a vacuum of 100 microns, or when in a transducer under normal operating conditions. Here again, all the fluids under consideration have good time-stability properties.

Because most transducers operate over a wide range of temperatures, their acoustic properties must be known in at least this range. Over this wide range of temperatures the liquid must behave in a controlled manner and not permanently change its character. With regard to this property, the castor oil becomes quite viscous at 0° centigrade and this factor prevents its use in polar climes or in cold water.

Since the liquid is introduced into the transducer under the vacuum, it should be stable in a vacuum. Although polyalkylene glycol and phenol polysiloxane do not change their properties in a vacuum, castor oil exhibited a tendency to polymerize when it was stored at less than 100 microns. There is evidence to indicate that polymerization affects an acoustic signal.

One of the most important properties of a liquid under consideration is that it be chemically compatible with all of the other materials in the transducer cavity. Changes in size or character of the transducer materials indicate deterioration. In this regard, it should be noted that the phenol polysiloxane attacks butyl and buna rubber commonly used in transducers as mounting elements, seals, etc.

Another desirable property is that a transducer liquid should have the capability of slowly absorbing water over a long period of time. Water seeps through, or migrates through, the neoprene acoustic windows used in a number of transducers. This absorbed water should not interfere with the transducer's electrical behavior or permit arcing-over through the liquid. From laboratory results recorded in the table of FIG. 1, it is clear that polyalkylene glycol by far exhibits the best equilibrium-water-content property.

One of the most important physical properties that a transducer fluid must have has to do with its viscosity. The viscosity should be sufficiently fluid to permit its easy flow into the transducer cavity and all minute openings yet not too thin so that it breaks through normal seals. A viscosity in the region of 100 centistokes appears to be reasonable and the three fluids' viscosity changes with temperature as shown in FIG. 5. Again, the polyalkylene glycol shows the least change in viscosity with respect to castor oil and phenol polysiloxane.

The next properties which should be considered in selecting the proper liquid in a transducer are the changes in volume as a function of pressure or temperature. A transducer with a fixed volume must have some way of accommodating the change in volume when there is a change of temperature or pressure. The consequence of not having such an accommodation is that the transducer case is deformed and, probably, the characteristics of the transferred signals are altered. In this respect the polyalkylene glycol shows the least change in volume brought on by changes in temperature and pressure.

Because the electrical fields and conductors within the transducer are in contact with the liquid, the dielectric constant of the liquid is important. The higher the dielectric constant the better, since there is better insulation of the conductive elements of the active element circuit. Polyalkylene glycol showed the most acceptable dielectric constant. A similar property, the volume resistivity, is excellent with the polyalkylene glycol although the phenol polysiloxane has a higher value.

The adhesive and cohesive properties of the liquid also are considered. Sound energy in the transducer is transported from the crystal face of the active element to the acoustic window for projection through the water. A projector operating at a high energy level will cavitate somewhere in the liquid bath either inside the transducer or outside in the water medium. Experience has demonstrated that it is to the designer's advantage that the cavitation occur outside the transducer. Therefore, the liquid must have a certain amount of adhesiveness, that being the ability of the liquid to bond to the boundaries inside the transducer cavity, and not pull free under the high tensile stess caused by the projection of high levels of acoustic energy.

The cohesiveness property of the liquid is similar to adhesiveness except that it is the ability of the liquid to resist tearing itself apart under the high stress conditions. Tests for adhesive and cohesiveness were performed in the laboratory with all three liquids exhibiting a good adhesiveness properties. However, the polyalkylene glycol showed no tendency to cavitate due to lack of cohesiveness whereas the other two liquids did.

Arcing between adjacent conductors in the active element and other conductors should be suppressed as much as possible. Arcing over can damage the transducer. It was observed that when arcing over did occur in a polyalkylene glycol filled transducer, neither the ceramic stack nor its conductor were damaged, and the arc path healed immediately so that performance was not impaired. In a castor oil filled transducer a carbon path was formed across the ceramic driving element and an electrical short circuit existed across the ceramic surface. Arcing through the phenol polysiloxane created an air path that provided subsequent arc overs and substantial surface etching on the outer rim of the driving element.

The effect on technicians and repairmen as well as the immediate environment should be such as to avoid an exposure to harmful vapors or caustic fluids. The polyalkylene glycol and castor oil pose no problems in this regard. However, the phenol polysiloxane is particularly irritating to the skin and eyes and was very difficult to remove from a transducer during a periodic replacement of the liquid.

Disposal of the three fluids called for either incinerating the liquid, returning them to the company, or placing them in a combustion chamber.

The last item to be considered before chosing a liquid would be that of cost. Here again, polyalkylene glycol is the cheapest, on a cost per pound basis, with phenol polysiloxane being more than fourteen times as expensive.

All things considered, polyalkylene glycol showed itself to be the preferred liquid. Fluid 28 is best. Somewhat lacking in some properties, the "LB-135" showed good operating characteristics, better than the castor oil and the phenol polysiloxane.

Obviously, many modifications and variations of the present invention are possible in the light of the above teachings and it is therefore understood that the invention may be practiced otherwise than as specifically described.

What is claimed is:

1. In a transducer of acoustic energy having a housing containing a ferroelectric element to be acoustically coupled to an acoustic window, an improvement therefor is provided comprising:

polyakylene glycol having acoustic properties making its velocity of sound propogation nearly equal to that of water, its density nearly equal to water, its acoustic impedance nearly equal to water and its signal attenuation nearly negligable, chemical properties ensuring long time stability and compatibility with other transducer materials, physical properties making its viscosity lower only thirty centistokes from zero to twenty degrees centigrade, and environmental properties allowing safe handling, fills the housing and all voids therein for acoustically coupling the active element to the acoustic window.

2. A method of acoustically coupling a ferroelectric element contained in a housing to an acoustic window comprising:

filling the housing and all voids therein with polyalkylene glycol having acoustic properties making its velocity of sound propogation nearly equal to that of water, its density nearly equal to water, its acoustic impedance nearly equal to water and its signal attenuation nearly negligable, chemical properties ensuring long time stability and compatibility with other transducer materials, physical properties making its viscosity lower only thirty centistokes from zero to twenty degrees centigrade, and environmental properties allowing safe handling.

* * * * *